United States Patent [19]

Yano

[11] Patent Number: 5,149,302
[45] Date of Patent: Sep. 22, 1992

[54] APPARATUS AND METHOD FOR CONNECTING A SCREW SHAFT AND A DRIVE CABLE IN A SHOULDER BELT POSITIONAL ADJUSTMENT DEVICE

[75] Inventor: Hideaki Yano, Shiga, Japan

[73] Assignee: Takata Corporation, Tokyo, Japan

[21] Appl. No.: 653,518

[22] Filed: Feb. 11, 1991

[30] Foreign Application Priority Data

Mar. 8, 1990 [JP] Japan .................. 2-57391

[51] Int. Cl.$^5$ ................................ F16C 1/06
[52] U.S. Cl. .................... 464/52; 464/177; 464/901
[58] Field of Search .............. 464/52, 53, 58, 177, 464/901

[56] References Cited

U.S. PATENT DOCUMENTS

| | | | |
|---|---|---|---|
| 3,211,485 | 10/1965 | Petersen | 464/901 X |
| 3,440,836 | 4/1969 | Peterson | 464/53 |
| 3,686,896 | 8/1972 | Rutter | 464/52 |
| 4,057,114 | 11/1977 | Anderson | 464/901 X |
| 4,280,338 | 7/1981 | Shannon et al. | 464/58 X |

FOREIGN PATENT DOCUMENTS

| | | | |
|---|---|---|---|
| 2531157 | 2/1984 | France | 464/52 |
| 264403 | 1/1950 | Switzerland | 464/53 |

*Primary Examiner*—Daniel P. Stodola
*Assistant Examiner*—Tony A. Gayoso
*Attorney, Agent, or Firm*—Kanesaka and Takeuchi

[57] ABSTRACT

An apparatus for connecting a screw shaft and a drive cable of a shoulder belt position adjusting device of a seat belt includes a first joint coupled to a connecting end of the screw shaft, and a second joint coupled to an connecting end of the drive cable. The first joint includes a rotatable member and a first holder for receiving the rotatable member therein. The second joint includes a coupling member, a second holder for receiving the coupling member, a recess formed on the second holder for receiving the rotatable member, a stopper formed inside the second holder between the recess and a hole for the coupling member, and a spring to urge the coupling member against the stopper. The coupling member and the rotatable member are engaged with each other. The first and second joints are connected together by an engaging element and a receiving element.

4 Claims, 5 Drawing Sheets

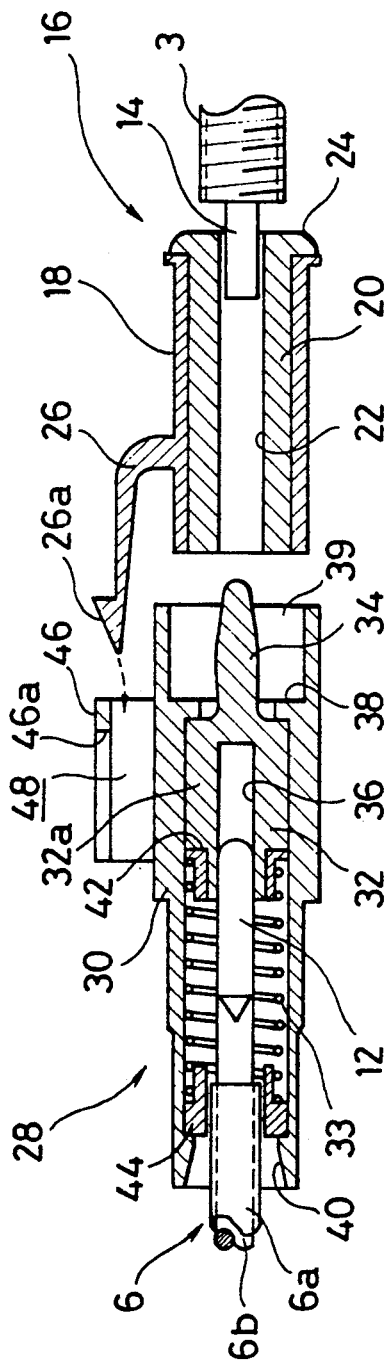
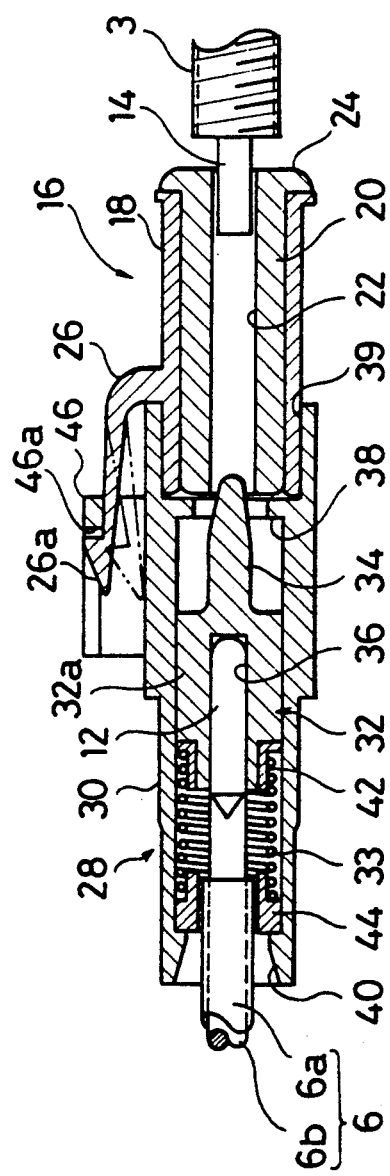

APPARATUS AND METHOD FOR CONNECTING A SCREW SHAFT AND A DRIVE CABLE IN A SHOULDER BELT POSITIONAL ADJUSTMENT DEVICE

FIELD OF THE INVENTION AND RELATED ART STATEMENT

This invention relates to a method of fabricating a seatbelt system used to protect or restrict a vehicle occupant in a vehicle seat and particularly, to an apparatus and a method for connecting a screw shaft and a drive cable in a shoulder belt positional adjustment device.

In general, an automotive vehicle includes a seatbelt to protect or restrict a vehicle occupant in a vehicle seat in case of collision or emergency.

Any portion of the seatbelt which restrains a vehicle occupant must have a sufficient strength to withstand a sudden load which is several ten times heavier than the weight of the occupant. Thus, it is preferable that a lap belt firmly engages a hipbone, and a shoulder belt is located between shoulder joints and the neck.

It will be appreciated that those restrained occupants include children and adults and therefore, considerably differ in size. Also, each occupant adjusts his own seat differently.

To this end, there has previously been proposed a shoulder belt positional adjustment device wherein the position of a shoulder belt anchor is adjusted to suitably restrain each vehicle occupant.

One known shoulder belt positional adjustment device is illustrated in FIGS. 5A, 5B and 6.

Illustratively, a shoulder belt positional adjustment device 1 includes a substantially U-shaped mount 2 attached to a center pillar 8A of a vehicle and having opposite bent members 2a and 2b, a screw shaft 3 mounted for rotation between the bent members 2a and 2b, an anchor support block 4 mounted for threaded engagement with the screw shaft 3 and moved in the direction of the arrow A while being guided by two guide rails 2d and 2d when the screw shaft 3 is rotated, a drive cable 6 having one end connected to the screw shaft 3 through a joint 5, and a motor M connected to the other end of the drive cable 6. The drive cable 6 includes a tubular outer cable 6a, and a rotatable inner cable 6b inserted into the outer cable 6a. In FIG. 5, 7 denotes a mounting hole through which a belt anchor 9 is mounted to loosely hold a shoulder belt 8.

With the shoulder belt positional adjustment device 1 thus constructed, the motor M is driven to rotate the screw shaft 3 in either one direction or a reverse direction through the drive cable 6. The support block 4 is, then, moved up or down along the guide rails 2d and 2d.

In the shoulder belt positional adjustment device, a leading (or connecting) end of the inner cable 6b of the drive cable 6 and a tail (or connecting) end of the screw shaft 3 are noncircular (i.e. rectangular) in section. The joint 5 has a noncircular hole to receive the leading end of the inner cable 6b and the tail end of the screw shaft 3.

In order to connect the inner cable 6b and the screw shaft 3 together, those connecting ends must be inserted into the hole of the joint 5. At this time, it is necessary to align the angular position of those connecting ends with the angular position of the hole of the joint since the connecting ends and the hole are both noncircular. This aligning operation is cumbersome, and a considerable amount of time is required to fabricate the positional adjustment device.

OBJECT AND SUMMARY OF THE INVENTION

It is an object of the present invention to provide an apparatus and a method for easily and rapidly connecting a screw shaft and a drive cable in a shoulder belt positional adjustment device.

In the present invention, a screw shaft has a noncircular section and is coupled to a first joint. Also, a drive cable has a noncircular section and is coupled to a second joint. The first and second joints are then joined to connect ends of the drive cable and the screw shaft together.

The first joint includes a substantially cylindrical rotatable member having a noncircular inner hole, and a substantially cylindrical holder into which the rotatable member is inserted for rotation about its own axis. One connecting end of the screw shaft is inserted into the inner hole of the rotatable member.

The second joint comprises a coupling member including a cylindrical body, a cable receiving bore extending axially from one end of the body, and a projection extending axially from the other end of the body and having a noncircular section, and a holder including a coupling member holding bore into which the body of the coupling member is inserted for rotation about its own axis. The holder of the second joint has a recess at its one end to receive the first joint. A stopper extends radially from the inner periphery of the holder between the coupling member holding bore and the recess to prevent release of the body of the coupling member from the holder. A spring is disposed within the coupling member holding bore to urge the body against the stopper. One connecting end of the drive cable is inserted into the cable receiving bore of the coupling member.

One of the holder of the first joint and the holder of the second joint has an engaging element extending in a direction toward the other holder. The other holder has a receiving element with which the engaging element is engaged. When the first and second joints are moved toward one another, then the engaging element is brought into engagement with the receiving element so as to prevent the first and second joints from moving apart from each other.

By coaxially moving the first joint coupled to the connecting end of the screw shaft and the second joint coupled to the connecting end of the drive cable toward one another, the engaging element comes into engagement with the receiving element to connect the first and second joints together and fit the projection of the coupling member into the inner hole of the rotatable member.

In a second embodiment, the first joint includes a substantially cylindrical rotatable member having a screw shaft receiving bore extending axially from its one end and having a noncircular section and a projection extending from its other end and having a noncircular section, and a substantially cylindrical holder into which the rotatable member is inserted for rotation about its own axis. One connecting end of the screw shaft is inserted into the screw shaft receiving bore of the rotatable. member.

The second joint comprises a substantially cylindrical coupling member having a noncircular inner hole, and a holder including a coupling member holding bore into which the coupling member is inserted for rotation about its own axis. The holder of the second joint includes a recess at its one end to receive the first joint, a stopper extending radially from the inner periphery of the holder between the coupling member holding bore and the recess to prevent release of the the coupling member from the holder, and a spring disposed within the coupling member holding bore to urge the coupling member against the stopper. One connecting end of the drive cable is inserted into one end of the inner hole of the coupling member.

One of the holder of the first joint and the holder of the second joint has an engaging element extending in a direction toward the other holder. The other holder has a receiving element with which the engaging element is engaged. When the first and second joints are moved toward one another, then the engaging element is brought into engagement with the receiving element so as to prevent the first and second joints from moving apart from each other.

By coaxially moving the first joint coupled to the connecting end of the screw shaft and the second joint coupled to the connecting end of the drive cable toward one another, the engaging element comes into engagement with the receiving element to connect the first and second joints together and fit the projection of the rotatable member into the inner hole of the coupling member.

In the first embodiment of the present invention the connecting end of the screw shaft is first inserted into the inner hole of the rotatable member of the first joint. The drive cable is, also, inserted into the cable receiving bore of the coupling member. Under the circumstances, the first and second joints are moved toward one another so as to engage the engaging element with the receiving element. This results in coupling of the both joints. At this time, the projection of the coupling member is inserted into the inner hole of the rotatable member so as to transmit rotation of the coupling member to the rotatable member. The projection of a noncircular section may not be inserted into the inner hole by simply moving the both joints toward one another. In such a case, the coupling member is pushed back or retreated by the rotatable member. To this end, the cable is slightly rotated to align the angular position of the projection with that of the inner hole after the joints are brought into engagement with each other. The projection can be inserted into the inner hole under the action of the springs.

As stated above, the screw shaft and the drive cable . are connected together by moving the first and second joints toward one another, engaging the engaging element with the receiving element, and slightly rotating or angularly moving the drive cable as necessary.

Also, in the second embodiment, the screw shaft and the drive cable are connected together by moving the first and second joints toward one another, and angularly moving the drive cable as necessary.

As discussed earlier, the first embodiment is different from the second embodiment in that in the former, the rotatable member has a projection, and the coupling member has an inner hole to receive the projection.

BRIEF DESCRIPTION OF THE DRAWINGS

FIGS. 1 to 3 are sectional views explaining the present invention;

DESCRIPTION OF THE PREFERRED EMBODIMENTS

The present invention will now be described by way of example with reference to the drawings.

Figure 3:
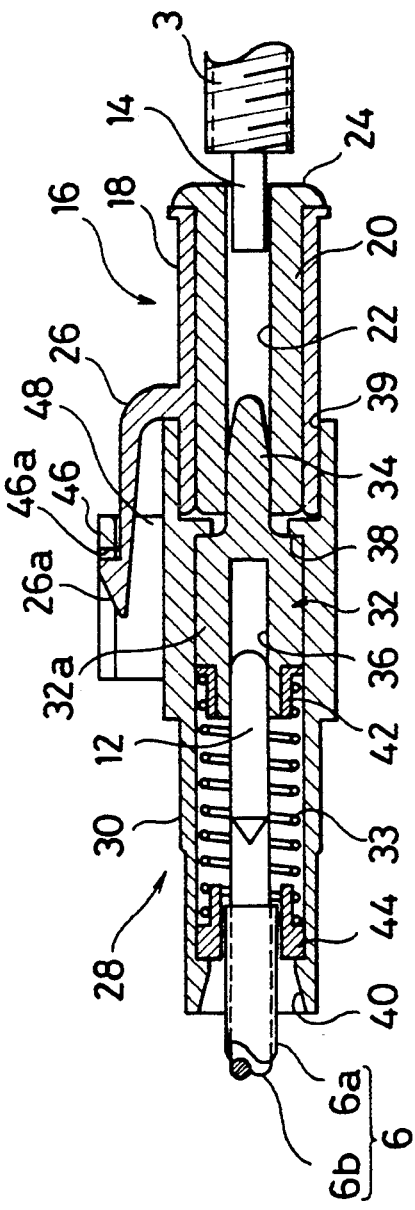
Figure 4:
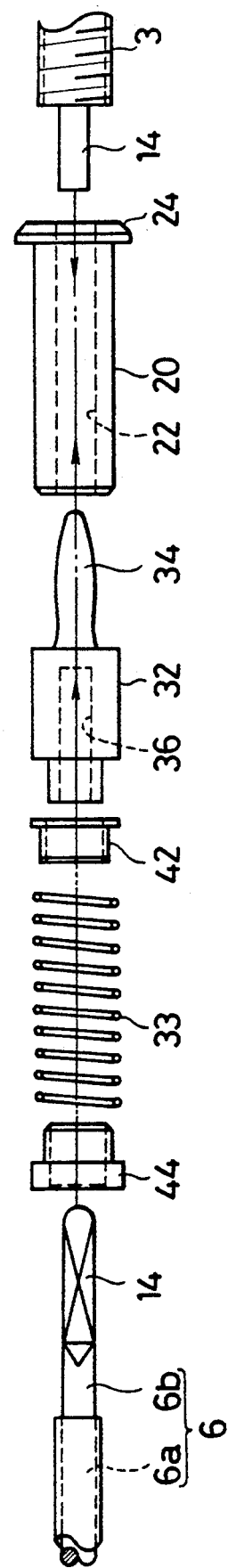
FIG. 4 is an exploded view of parts used in the present invention.
Figure 5A:
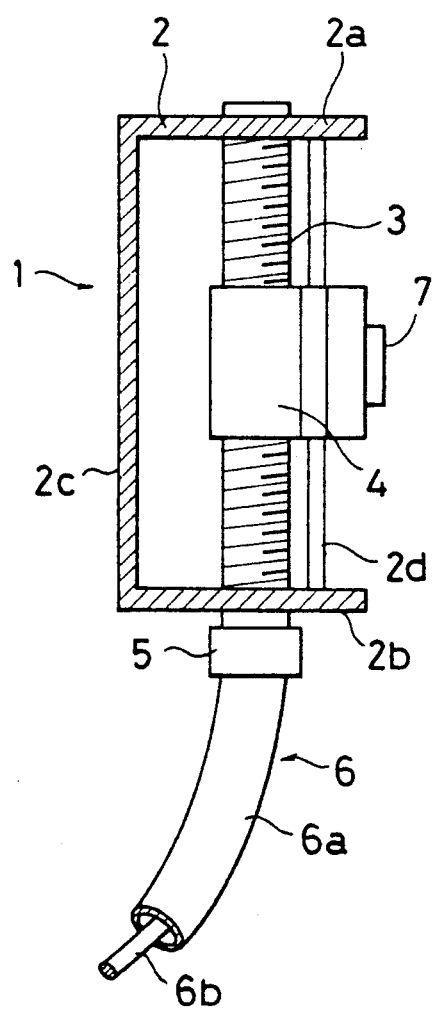
FIGS. 5A and 5B are sectional views showing the prior art.
Figure 5B:
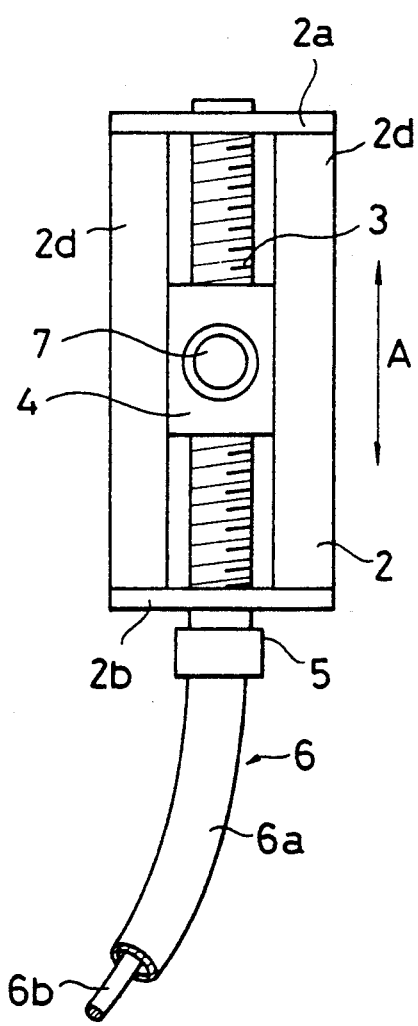
Figure 6:
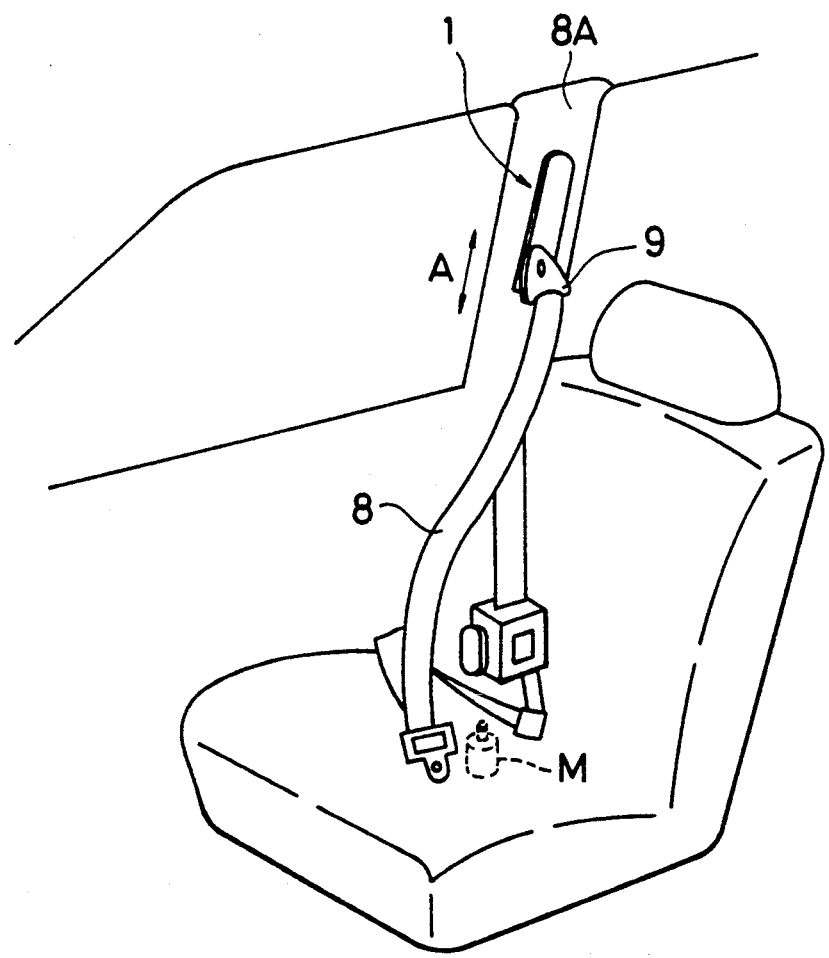
FIG. 6 is a perspective view of a seatbelt system.

FIGS. 1 and 2 are sectional views showing a method according to one embodiment of the present invention. FIG. 3 is a sectional view of an apparatus, wherein a screw shaft and a drive cable are connected together according to the present invention. FIG. 4 is a exploded view of parts used to connect the screw shaft and the drive cable.

With reference to FIG. 1, a screw shaft 3 and a drive cable 6 are now being connected. As is conventional, the drive cable 6 includes an outer cable 6a and an inner cable 6b. The inner cable 6b has a connecting end 12 of a rectangular section. The screw shaft 3 has a connecting end 14 of a rectangular section.

A first joint 16 has a substantially cylindrical holder 18, and a rotatable member 20 inserted for rotation about the axis of the holder 18. In the illustrated embodiment, the rotatable member 20 is substantially cylindrical in shape and has an inner hole 22 of a rectangular section. The rotatable member 20 has a collar 24 at its one end. The holder 18 has an end surface with which the collar 24 is engageable. The connecting end 14 of the screw shaft 3 is inserted into the inner hole 22. The holder 18 has an engaging element 26 for engagement with a second joint as will later be described. The engaging element 26 has a projection 26a at its one end.

A second joint 28 generally includes a substantially cylindrical holder 30, a coupling member 32 inserted for rotation about the axis of the holder 30, and a spring 33 disposed to bias the coupling member 32. The coupling member 32 has a substantially cylindrical body 32a. A projection 34 extends axially from one end of the body 32a and has a rectangular section. A cable receiving bore 36 extends axially from the other end of the body 32a and has a rectangular section. The connecting end 12 of the inner cable 6b is received in the cable receiving bore 36.

The holder 30 has a recess 39 at its one end to receive the first joint 16.

A stopper 38 extends radially inwardly from the inner periphery of the holder 30 and located between the cable receiving bore 36 and the recess 39. The body 32a of the coupling member 32 has one end which can be brought into contact with the stopper 38. The projection 34 extends through the stopper 38 and is adapted for insertion into the inner hole 22 of the rotatable member 20. The holder 30 has an inwardly directed projection 40 at its other end. The spring 33 is disposed between the projection 40 and the coupling member 32. Bushings 42 and 44 are located at opposite ends of the spring 33.

The holder 30 has a receiving element 46 for engagement with the engaging element 26. Defined between the receiving element 46 and the body of the holder 30 is a space 48 into which the projection 26a of the engaging element 26 is inserted to engage with an end surface 46a of the receiving element 46.

With the first joint 16 and the second joint 28 thus constructed, the screw shaft 3 and the drive cable 6 are connected in such a manner as will now be described.

First, the connecting end 14 is inserted into the inner hole 22 of the rotatable member 20 so as to engage the screw shaft 3 with the first joint 16. The connecting end 12 of the inner cable 6b is also inserted into the cable receiving bore 36 so as to engage the drive cable 6 with the second joint 28. The first joint 16 and the second joint 28 are, thereafter, moved toward one another to fit the rotatable member 18 into the recess 39 of the holder 30. At this time, the end of the engaging element 26 is inserted into the space 48 between the receiving element 46 and the holder 30. When the first joint 16 and the second joint 28 are further moved together, then the projection 26a is brought into engagement with the end surface 46a of the receiving element 46. As a result, the first joint 16 is prevented from being disengaged from the second joint 28.

The projection 34 and the hole 22 both have a rectangular section. As shown in FIG. 2, if the angular position of the projection 34 is not aligned with that of the inner hole 22, then the projection 34 can not be inserted into the inner hole 22. As a result, the coupling member 32 is pushed back or shifted to the left in FIG. 2. In such a case, the inner cable 6b is slightly rotated to align the angular position of the projection 34 with that of the inner hole 22. The projection 34 is, then, moved toward the hole 22 under the action of the spring 33 (see FIG. 3).

With reference to FIG. 3, engagement of the engaging element 26 with the receiving element 46 prevents the first joint 16 and the second joint 28 from moving apart from one another and thus, ensures connection between the first and second joints. The projection 34 is inserted deeply into the bore 22 so as to transmit rotation of the coupling member 32 to the rotatable member 20. Therefore, rotation of the inner cable 6b causes the screw shaft 3 to rotate.

In the method of this embodiment, the first joint 16 is moved toward the second joint 28 and then inserted thereinto. This simply provides a connection between the screw shaft 3 and the drive cable 6.

FIG. 3 shows complete connection of the screw shaft 3 with the drive cable 6. In order to disconnect the screw shaft 3 from the drive cable 6, the projection 26a is pressed, and the second joint 28 is pulled in a direction to move away from the first joint 16.

In the embodiment, the first joint 16 has the projection 26, and the second joint 28 has the receiving element 46. Alternatively, the first joint 16 may include the receiving element 46, and the second joint 28 has the engaging element 26.

In accordance with the present invention, the screw shaft 3 and the drive cable 6 are connected together after shoulder belt positional adjustment device is attached to the vehicle body. In this way, the shoulder belt positional adjustment device can readily and immediately be attached to the vehicle body.

Figure 7:
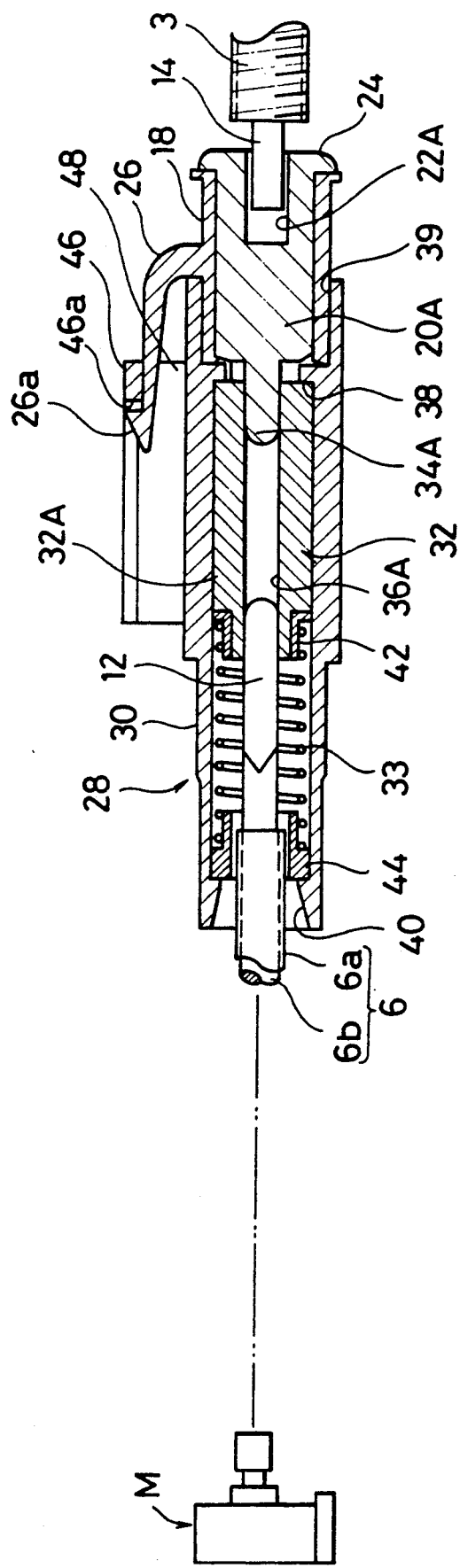
FIG. 7 is a sectional view of another embodiment of the present invention.

FIG. 7 is a sectional view of an alternative embodiment.

In this embodiment, a rotatable member 20A has a blind bore 22A at its one end to receive the connecting end 14, and a projection 34A at its other end. A coupling member 32A is cylindrical and has an inner bore 36A. Other parts of the embodiment are identical in structure to those shown in FIGS. 1 to 3 and are designated by like reference numerals used in FIGS. 1 to 3.

Also, in this embodiment, the first joint 16 with the connecting end 14 inserted into the blind bore 22A is moved toward the second joint 28 with the connecting rod 12 inserted into the inner bore 36A. The screw shaft 3 and the drive cable 6 are, then, connected together while the inner cable 6b is being rotated as necessary.

What is claimed is:

1. An apparatus for connecting a screw shaft and a drive cable in a shoulder belt position adjusting device of a seat belt, said screw shaft having a connecting end with a noncircular section and said drive cable having a connecting end with a noncircular section, said apparatus comprising:

a first joint device including a cylindrical rotatable member having a noncircular inner hole, said connecting end of the screw shaft being inserted into one end of the inner hole of the rotatable member; and a first holder for rotationally holding the rotatable member, a second joint device including a coupling member having a cylindrical body, a cable receiving bore extending axially inwardly from one end of the cylindrical body, said connecting end of the drive cable being inserted into the cable receiving bore, and a projection extending axially outwardly from another end of the body and having a noncircular section, said projection being engageable with one end of said inner hole of the rotatable member; a second holder having a coupling member holding bore for rotationally receiving the coupling member at one side thereof, a recess formed at another side of the second holder for receiving the first holder therein, and a stopper for partly separating the coupling member holding bore and the recess; and a spring situated in the coupling member holding bore to urge the cylindrical body of the coupling member toward the stopper, said spring, in case the projection does not enter into the inner hole of the rotatable member when the first and second joint devices are connected together, being compressed to allow the coupling member to move away from the stopper, and when the projection aligns the inner hole of the rotatable member, said spring pushing the coupling member to engage with the rotatable member, an engaging element formed on one of the first and second holders and extending toward the other of the first and second holders, and a receiving element formed on said other of the first and second holders, said engaging element being inserted into the receiving element to immovably connect the first and second joint devices together, said engaging element and receiving element being joined together when the first and second joint devices are joined together regardless connection of the projection of the coupling member and the inner hole of the rotatable member.

2. An apparatus according to claim 1, wherein said cable receiving bore of the cylindrical body and the connecting end of the drive cable are arranged such that the cylindrical body is able to move axially but is prevented from rotation relative to the drive cable, said cylindrical body being fully disposed over the connecting end of the drive cable when the projection does not enter the inner hole of the rotatable member, and said cylindrical body being partly disposed over the connecting end of the drive cable when the projection enters the inner hole of the rotatable member.

3. An apparatus for connecting a screw shaft and a drive cable in a shoulder belt position adjusting device of a seat belt, said screw shaft having a connecting end with a noncircular section and said drive cable having a connecting end with a noncircular section, said apparatus comprising:
- a first joint device including a cylindrical rotatable member having a noncircular screw shaft receiving bore at one side, said connecting end of the screw shaft being inserted into the bore of the rotatable member, and a projection extending axially from a side opposite to said one side and having a noncircular section; and a first holder for rotationally holding the rotatable member,
- a second joint device including a coupling member having an inner hole with a noncircular section, said connecting end of the drive cable being inserted into the inner hole at one end and said projection being engageable with the inner hole at an end opposite to said one end; a second holder having a coupling member holding bore for rotationally receiving the coupling member at one side thereof, a recess formed at another side of the second holder for receiving the first holder therein, and a stopper for partly separating the coupling member holding bore and the recess; and a spring situated in the coupling member holding bore to urge the coupling member toward the stopper, said spring, in case the projection of the rotatable member does not enter into the inner hole of the coupling member when the first and second joint devices are connected together, being compressed to allow the coupling member to move away from the stopper, and when the projection aligns the inner hole of the coupling member, said spring pushing the coupling member to engage with the rotatable member,
- an engaging element formed on one of the first and second holders and extending toward the other of the first and second holders, and
- a receiving element formed on said other of the first and second holders, said engaging element being inserted into the receiving element to immovably connect the first and second joint devices together, said engaging element and receiving element being joined together when the first and second joint devices are joined together regardless connection of the projection of the rotatable member and the inner hole of the coupling member.

4. An apparatus according to claim 3, wherein said inner hole of the coupling member and the connecting end of the drive cable are arranged such that the coupling member is able to move axially but is prevented from rotation relative to the drive cable, said coupling member being fully disposed over the connecting end of the drive cable when the projection does not enter the inner hole of the coupling member, and said coupling member being partly disposed over the connecting end of the drive cable when the projection enters the inner hole of the coupling member.

* * * * *